United States Patent
Fitzgerald et al.

(10) Patent No.: US 12,296,881 B2
(45) Date of Patent: *May 13, 2025

(54) TOTE-DOLLY SYSTEM

(71) Applicant: Valet Living, LLC, Tampa, FL (US)

(72) Inventors: Thomas M Fitzgerald, Havertown, PA (US); Nicholas Choma, Tampa, FL (US); Marc William Cramer, Tampa, FL (US)

(73) Assignee: Valet Living, LLC, Tampa, FL (US)

( * ) Notice: Subject to any disclaimer, the term of this patent is extended or adjusted under 35 U.S.C. 154(b) by 99 days.

This patent is subject to a terminal disclaimer.

(21) Appl. No.: 17/849,289

(22) Filed: Jun. 24, 2022

(65) Prior Publication Data

US 2022/0324499 A1    Oct. 13, 2022

Related U.S. Application Data

(63) Continuation-in-part of application No. 16/932,132, filed on Jul. 17, 2020.

(60) Provisional application No. 62/875,016, filed on Jul. 17, 2019.

(51) Int. Cl.
*B62B 3/00* (2006.01)
*D06F 95/00* (2006.01)

(52) U.S. Cl.
CPC ............ *B62B 3/005* (2013.01); *D06F 95/004* (2013.01); *B62B 2202/66* (2013.01)

(58) Field of Classification Search
CPC ... B62B 3/005; B62B 2202/66; B62B 5/0093; D06F 95/004
See application file for complete search history.

(56) References Cited

U.S. PATENT DOCUMENTS

| | | | | | |
|---|---|---|---|---|---|
| 2,717,437 | A | * | 9/1955 | De Mestral | A44B 18/0038 428/95 |
| 2,895,782 | A | * | 7/1959 | Fragale | D06F 95/002 211/184 |
| D200,503 | S | * | 3/1965 | Schuman | D32/37 |
| 5,515,573 | A | * | 5/1996 | Frey | A47L 5/365 15/327.2 |
| 5,690,217 | A | * | 11/1997 | Friday | D06F 95/002 220/532 |
| 5,758,888 | A | * | 6/1998 | Burgan | B65F 1/14 280/79.5 |

(Continued)

OTHER PUBLICATIONS

Velcro: 25 Yard Roll https://www.amazon.com/ONE-WRAP-Tape-25-Yard-ROLL/dp/B071Y3TVNT?th=1 (Year: 2012).*

*Primary Examiner* — Don M Anderson
*Assistant Examiner* — Justin Caudill
(74) *Attorney, Agent, or Firm* — Thomas H. Stanton

(57) ABSTRACT

The invention relates to a tote-dolly system is configured to enable quick detachable attachment of the tote to the dolly. An exemplary tote has one or more tote-fasteners that can be quickly engaged with corresponding dolly-fasteners. An exemplary fastener may be a buckle having a clip and receiver that is quickly engaged. A preferred fastener is a hook-and-loop fastener configured on the top of the dolly and on the bottom of the tote. It may be preferred to have one of the tote-dolly components have discrete pieces of hook-and-loop fastener to facilitate detachment of the components.

10 Claims, 13 Drawing Sheets

(56) References Cited

U.S. PATENT DOCUMENTS

| | | | | |
|---|---|---|---|---|
| 5,833,336 | A * | 11/1998 | Dean | D06F 95/002 |
| | | | | 312/351 |
| 6,488,293 | B1 * | 12/2002 | Mitchell | B62B 3/104 |
| | | | | 280/79.5 |
| 7,677,580 | B2 * | 3/2010 | Vanderberg | B62B 3/10 |
| | | | | 280/79.5 |
| D739,988 | S * | 9/2015 | Buckner | D32/37 |
| 9,162,694 | B1 * | 10/2015 | Fucarino | B62B 1/14 |
| 10,286,943 | B1 * | 5/2019 | Greenblatt | B65D 19/42 |
| 10,376,030 | B1 * | 8/2019 | Koh | B62B 3/02 |
| 2006/0157358 | A1 * | 7/2006 | Heidel | D06F 95/002 |
| | | | | 206/278 |
| 2012/0286486 | A1 * | 11/2012 | Varney | B65F 1/1473 |
| | | | | 280/47.11 |
| 2020/0063332 | A1 * | 2/2020 | Holderness | A45C 7/0063 |

* cited by examiner

TOTE-DOLLY SYSTEM

CROSS-REFERENCE TO RELATED APPLICATIONS

This application is a Continuation-In-Part Utility Patent application claiming priority to U.S. patent application Ser. No. 16/932,132 filed on Jul. 17, 2020, which in turn claims the benefit of U.S. Provisional patent Application Ser. No. 62/875,016, filed on Jul. 17, 2019, both of which are incorporated by reference herein in their entirety.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

Trademarks used in the disclosure of the invention, and the applicants, make no claim to any trademarks referenced.

BACKGROUND OF THE INVENTION

1) Field of the Invention

The invention relates to the field of a tote dolly attachment system wherein the tote can easily be detached from a dolly.

2) Description of Related Art

Currently the state of the art includes totes that are placed on dollies for the purpose of collection linens, such as bedsheets and towels, in the tote. A tote and dolly are used by hotel staff to collect linens as the rooms are cleaned. When moving a tote from room to room, the tote can easily be displaced and fall off of the dolly. This wastes time and requires the cleaning staff to replace the tote on the dolly, thereby wasting time and requiring the staff to pick up the heavy tote.

BRIEF SUMMARY OF THE INVENTION

The instant invention in one form is directed to a tote-dolly system that enables quick attachment of the tote to the dolly. An exemplary tote comprises one or more tote-fasteners that can be quickly engaged with corresponding dolly-fasteners. An exemplary fastener may be a buckle having a clip and receiver that is quickly engaged. A preferred fastener is a hook-and-loop fastener configured on the top of the dolly and configured to engage with hook-and-loop fastener configured on the bottom of the tote. A dolly has a dolly frame or platform with wheels coupled thereto. A tote may be a bag configured to carry and retain articles and an exemplary tote may be free-standing, wherein the tote will stand upright on its bottom or base with the top opening open for receiving articles therein. A tote may be made out of a fabric or plastic that is free-standing.

The buckle type tote-fastener may be coupled to the tote, such as to the side of the tote, by a tote-fastener extension, such as a strap, to enable some mobility of the fastener to allow for alignment and engagement with the dolly-fastener. The buckle type dolly-fastener may also be coupled to the dolly by a dolly-fastener extension, such as a piece of fabric, strap or cord extending from the dolly to the buckle. The length of a fastener extension, tote and/or dolly fastener extension, may be about 25 mm or more about 200 mm or more, a preferred length is approximately 100 mm. However the length can be any suitable length. In another embodiment, only one of the tote-fastener or dolly-fastener has a fastener extension and the other portion of the buckle on the other component is attached to the component without an extension. An exemplary tote-dolly system may comprise one or more buckle fasteners that couples the tote to the dolly. The instant invention envisions using two or more, or three or more, or four or more, or five or more fastener pairs of dolly-fasteners and tote-fasteners to attach the tote to the dolly. However, two or more buckles are preferred to ensure the tote does not slip off of the dolly.

An exemplary tote-dolly system may comprise a dolly-fastener configured with hook-and-loop fastener configured on a dolly extension, such as a strap. The hook-and-loop fastener may be configured on or proximal to an extended end of the dolly extension or strap, and the tote may be configured with hook-and-loop fastener configured along the sides of the tote for coupling with the hook-and-loop fastener configured on the dolly-extension. The tote hook-and-loop fastener may be configured in a ring that extends around the tote at some distance up from the bottom or may be configured with discrete hook-and-loop fasteners configured to correspond with the location of the dolly extension having said hook-and-loop fastener configured thereon. A ring type hook-and-loop fastener configured around the tote may make it easier for alignment of the two components of the hook-and-loop fastener. A ring of hook-and-loop fastener of the tote or the dolly may extend some portion around the perimeter of the tote, such about substantially about the perimeter or at least 50% around the perimeter.

An exemplary hook-and-loop fastener may be discrete, wherein it does not extend in a ring or across the entire top surface of the dolly or bottom surface of the tote. Configuring at least one of the tote or dollies with discrete hook-and-loop fastener may aid in the detachment of the two components. A completely engaged surface or a ring of hook-and-loop fastener may be more difficult to disengage. One of the tote-dolly systems may be configured with a plurality of discrete hook-and-loop fasteners pads or pieces, such as two or more, three or more, four or more, five or more and any range between and including the number of discrete pieces listed, Each discrete pad may have a dimension, length and/or width of about 200 mm or less, about 180 mm or less, about 160 mm or less, about 140 mm or less, about 120 mm or less, about 100 mm or less. An exemplary discrete hook-and-loop fastener may have an area of about 30 square cm or more about 50 square cm or more about 70 square cm or more about 100 square cm or more, or no more than 150 square cm, or no more than about 100 square cm.

The summary of the invention is provided as a general introduction to some of the embodiments of the invention, and is not intended to be limiting. Additional example embodiments including variations and alternative configurations of the invention are provided herein.

These and other objects, features, and advantages of the present invention will become more readily apparent from the attached drawings and the detailed description of the preferred embodiments, which follow.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION

Figure 1:
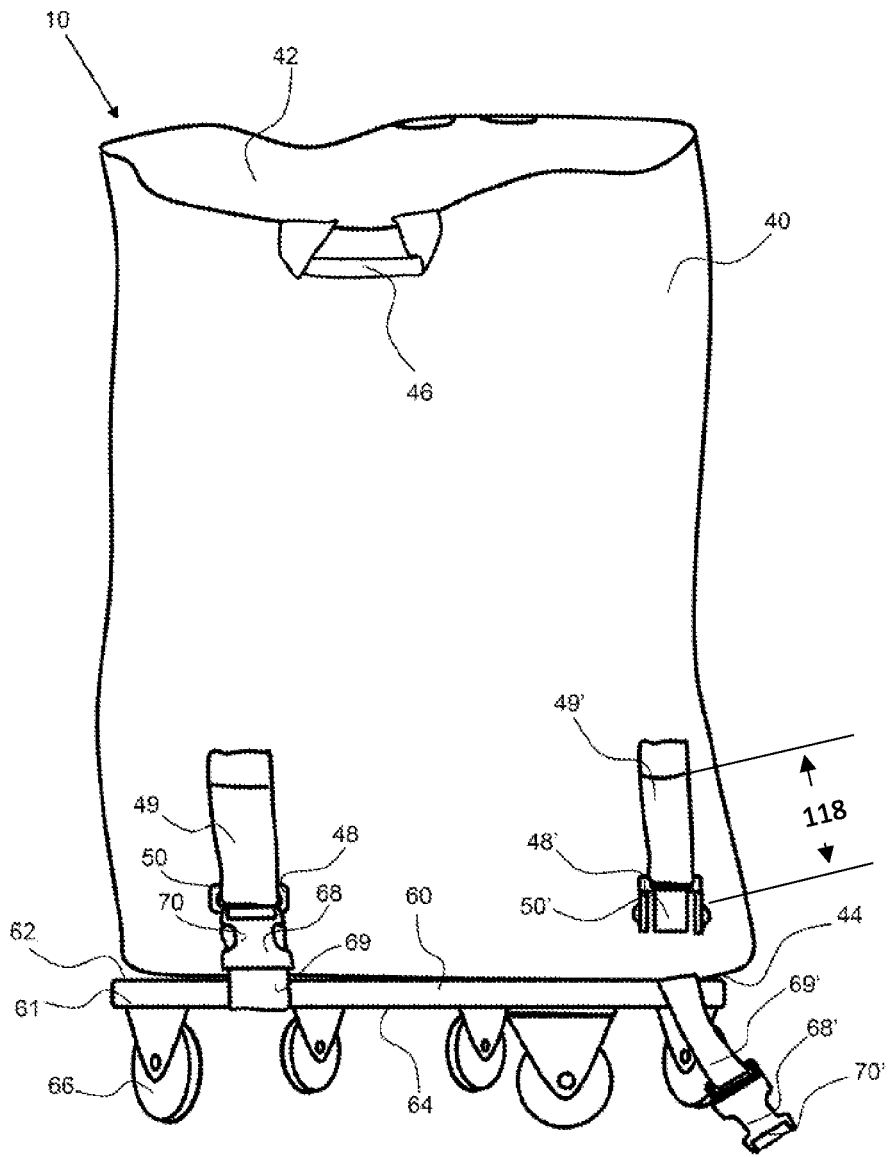
FIG. 1 shows a side view of an exemplary tote-dolly system comprising a tote detachably attached to a dolly.
Figure 2:
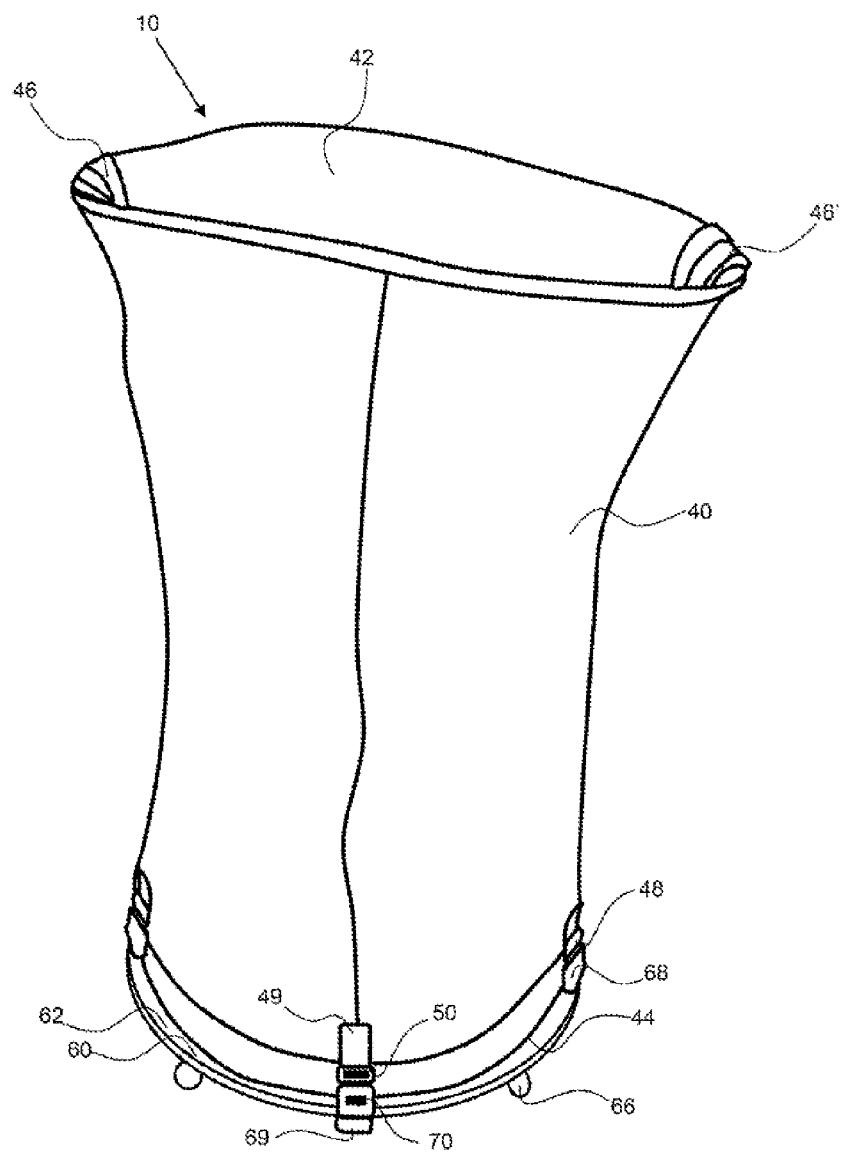
FIG. 2 shows a top perspective view of an exemplary tote-dolly system comprising a tote detachably attached to a dolly.
Figure 3:
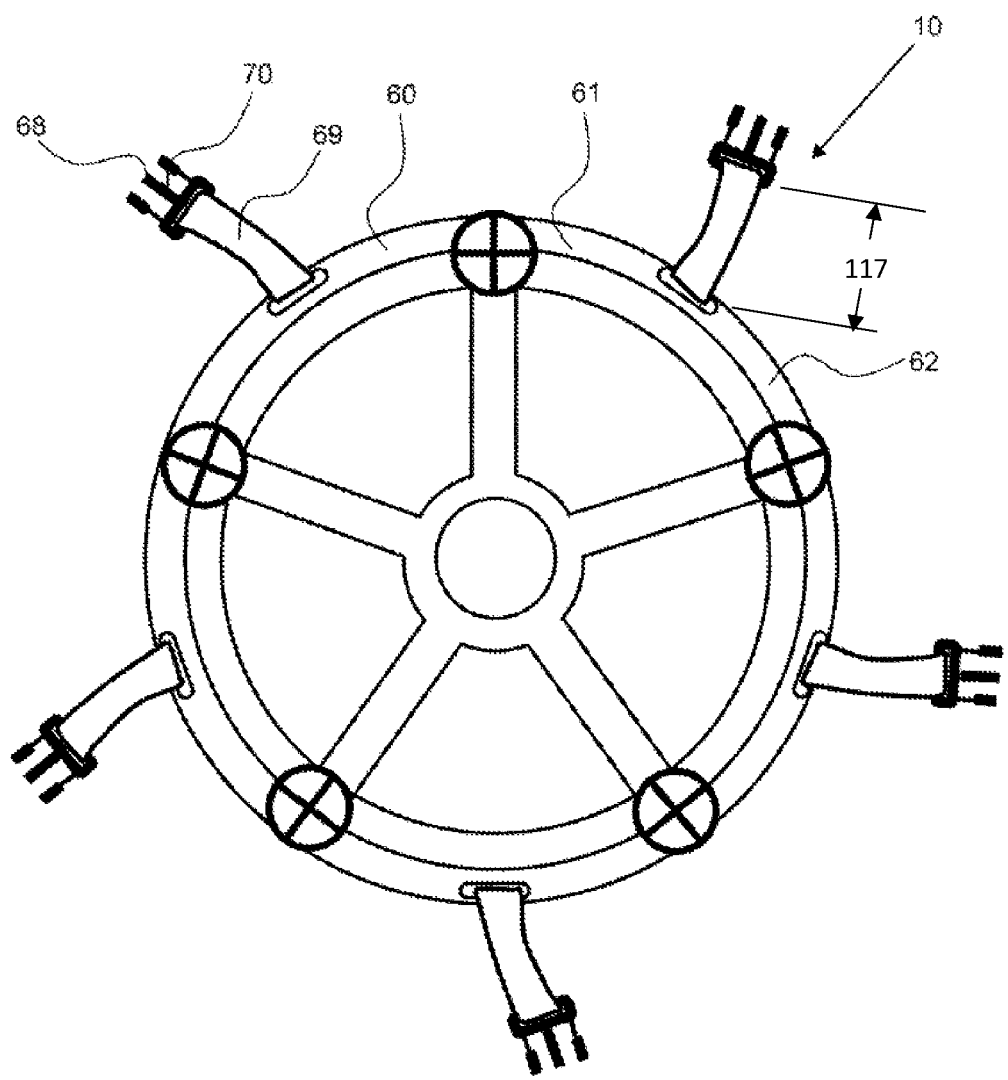
FIG. 3 shows a top view of an exemplary dolly having a plurality of dolly fasteners, buckles, extending from the dolly by dolly-fastener extensions.
Figure 4:
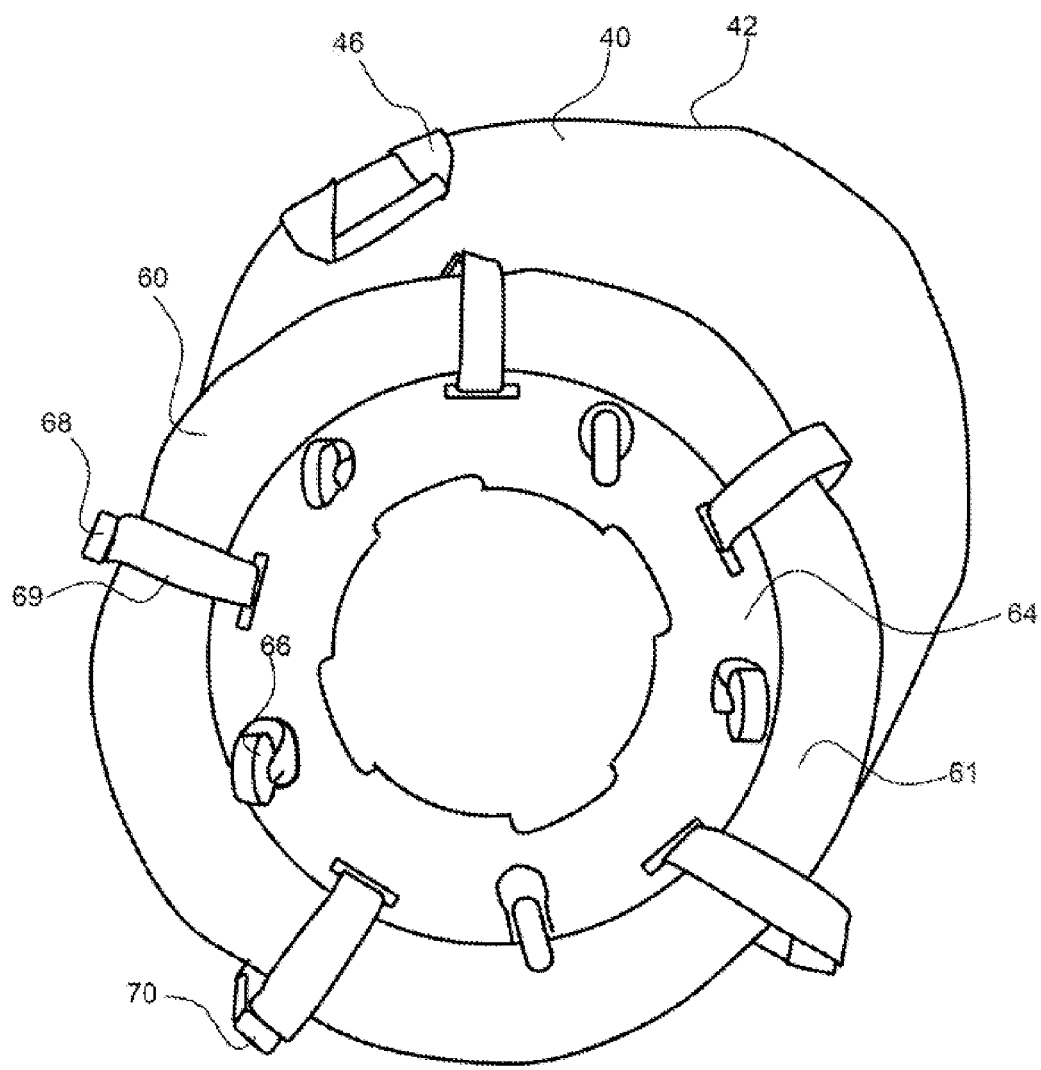
FIG. 4 shows bottom view of an exemplary tote-dolly system comprising a tote detachably attached to a dolly.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art however that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token however, no single feature or features of any described embodiment should be considered essential to every embodiment of the invention, as other embodiments of the invention may omit such features.

In this application the use of the singular includes the plural unless specifically stated otherwise and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure be considered as an example of the principles of the invention and not intended to limit the invention to the specific embodiments shown and described.

The term tote, compartment and container are used interchangeably to mean a device that is removably attachable to a dolly of the instant invention and capable of holding items such as laundry. The tote can be tubular or rectangular in shape.

The term dolly, cart or platform with wheels are used interchangeably to mean a device that is used to transport the tote of the instant invention.

The term Hook-and-loop as used in the specification is meant to mean either a fastener closure system having a hook portion and a loop portion. Alternatively it could also be a fastener such as Velcro®.

The term person and user as used in the specification is meant to mean a person who uses the instant invention.

The terms place and location as used in the specification is meant to mean any location accessible by the dolly of the instant invention.

Prior to a discussion of the preferred embodiment of the invention, it should be understood that while the features and advantages of the invention are illustrated in terms of a container for transporting linen and towels the container can also be used for any items that are collected and transported from one place to an alternate place.

The instant invention is a device comprising of a tote and dolly system that enables quick detachable attachment of the tote to the dolly. The tote can be comprised of either a single compartment or multiple compartments and the tote can be collapsible or semi collapsible. The tote can also have a removable inner base that forms a firm or solid bottom for the tote. This inner base can provide rigidity for the tote bottom so that it sits firmly on the dolly.

The tote of the instant invention is envisioned to have one or more tote-fasteners attached to the bottom of the tote that are removably attachable to the dolly such that the tote can be quickly engaged with corresponding dolly-fasteners. An exemplary fastener may be a buckle having a clip and receiver that is quickly engaged however any suitable connector can be used that allows the tote to be rapidly separated from the dolly. The fastener can also be a Velcro® fastener which allows quick and easy attachment and detachment of the tote to the dolly. Another preferred fastener is a hook-and-loop fastener configured on the top of the dolly and configured to engage with hook-and-loop fastener configured on the bottom of the tote.

The dolly is formed from a rigid material which is capable of forming a platform capable of supporting the tote. The dolly frame or platform has two sides the first side is the top and is designed to removable receive the tote and the second side is the bottom and it preferably has wheels attached to the dolly. The dolly is designed to removably receive different totes. A tote may be a bag or container configured to carry and retain articles and an exemplary tote may be free-standing, wherein the tote will stand upright on its bottom or base with the top opening open for receiving articles therein. A tote may be made out of a canvas, fabric or plastic that can enable a free-standing tote. The tote can also be made from a series of collapsible rings which can collapse or telescope with respect to one another so that the height of the tote is adjustable and the tote wall is made from a plastic sheet or other material that is more rigid than flexible canvas or fabric. The rings are similar to a pipe and provide the invention with a telescoping design that allows the tote to expand and contract.

The tote can also be made so that there are multiple compartments or containers within the tote configured to receive items. The compartments or containers can be arranged so that they are stacked one on top of the other or alternatively side by side and oriented in the vertical such that the openings are at the top of the assembled container.

The instant invention comprises the following components:
 a. Dolly with wheels and dolly-fasteners;
 b. A tote with at least one compartment and tote-fasteners;

The instant invention also envisions the assembly of all the items into a kit. The kit makes the installation simple and easy for the user because all the parts necessary to collect items is provided. The kit can comprise of at least one dolly with wheels and dolly-fasteners and at least one tote comprised of a container having at least one compartment and tote-fasteners.

In summary the instant invention is a tote-dolly system comprising:
 a) a tote comprising:
  i. a top opening;
  ii. a bottom;
  iii. at least one tote-fastener;
 b) a dolly comprising:
  iv. a dolly frame having a top and a bottom;
  v. wheels extending from the bottom;
  vi. at least one dolly-fastener;
 c) wherein the tote is removably connected to the dolly when the at least one tote fastener is connected to the at least one dolly-fastener.

The tote-fastener is a hook-and-loop fastener and wherein the dolly-fastener is a enabled to connect with the tote-fastener. The tote-fastener could either be the hook or the lop portion and the dolly-fastener would be the corresponding portion so that the tote-fastener can connect to the dolly-fastener.

The tote-fastener is proximal to the bottom of the tote.

The dolly-fastener is proximal to the top of the dolly.

The tote-fastener are located substantially evenly spaced around the bottom of the tote and secured to the tote by a fastening method such as a clip, sewing, Velcro®, hook-and-loop fastener, adhesive or a zipper.

The dolly-fastener are located substantially evenly spaced around the dolly top of the dolly and are configured on a perimeter of the dolly frame.

The dolly-fastener extension has a length of 200 mm or less and the tote-fastener extension has a length of 200 mm or less.

The tote in one embodiment is comprised of at least one compartment and the at least one compartment is arranged vertically and the at least one compartment has an opening at the top of the at least one compartment. In an second alternative embodiment the at least one compartment is arranged horizontally and the at least one compartment has an opening or door on the side of the at least one compartment.

A third alternative embodiment is where the tote has at least two vertically oriented compartments and these compartments can be formed from separate containers or from one container with a divider installed to form the at least two compartments. The divider can be removable or fix. If the divider is removable then the divider is attached to the tote with fasteners such as clips, zipper, Velcro® or hook-and-loop fastener.

Referring to FIGS. 1 to 13 which provides a detailed descriptions and identification of the elements and more preferably FIGS. 1-4, an exemplary tote-dolly system 10 comprises a tote 40 that is detachably attachable to a dolly 60. As shown in FIG. 1 the exemplary tote is tubular shaped having a top opening 42 for receiving articles such as linens including towels and bed sheets. The bottom 44 of the tote is configured on the top 62 of the dolly and is secured to the tote by the tote-fastener 48, a tote-buckle 50 coupled with the dolly-fastener 68, also a dolly-buckle 70. The tote-buckle and the dolly-buckle may clip together having one portion that is inserted in to the opposing portion. The tote-fastener is coupled to the tote frame 61 by a tote-fastener extension 49 and the tote-fastener extension 49 has a length 118 which is a maximum of 200 mm or less. The dolly-fastener is coupled to the dolly by a dolly-fastener extension 69 and the dolly-fastener extension 69 has a length 117 which is at least 50 mm in length from the dolly to the dolly-fastener and a maximum of 200 mm or less. The dolly has a plurality of wheels 66 extending from the bottom 64 of the dolly to allow the tote to be moved easily from room to room to collect lines, for example. Preferably the dolly has at least 3 wheels. However, the instant invention envisions embodiments with 3, 4, 5, 6, 7 and 8 wheels. The tote has a pair of handles 46 to guide the tote-dolly system and to aid in picking up the tote.

Figure 5:
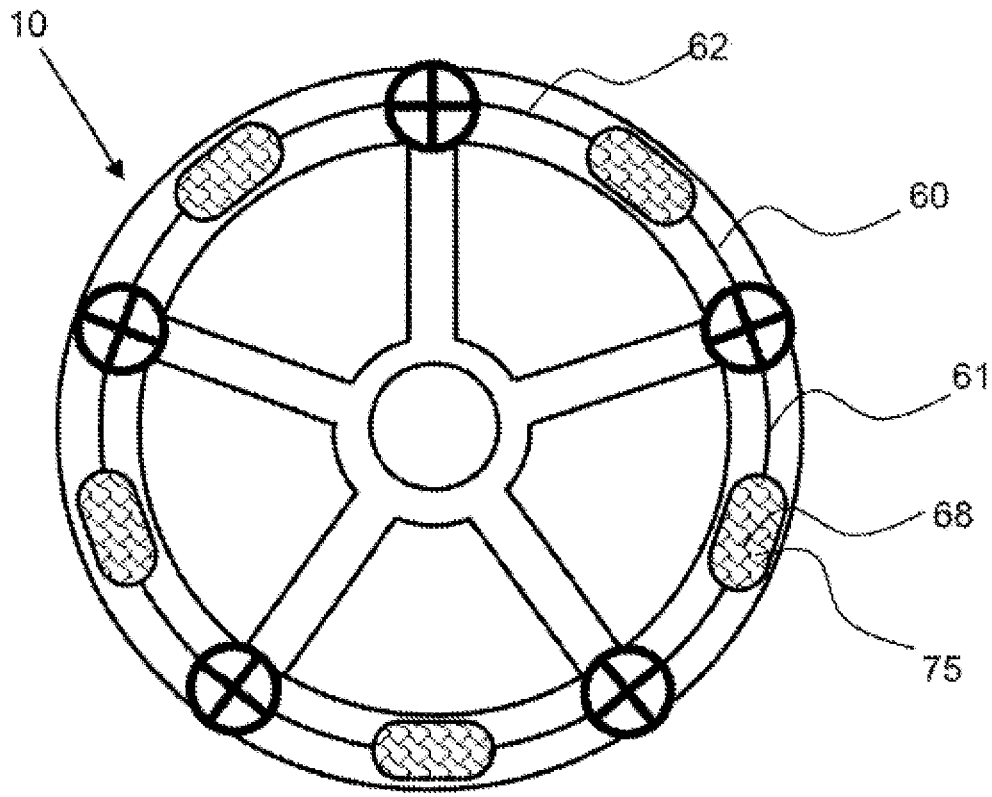
FIG. 5 shows a top view of an exemplary dolly having a plurality of discrete hook-and-loop fasteners on the top surface for detachably attaching the tote.
Figure 6:
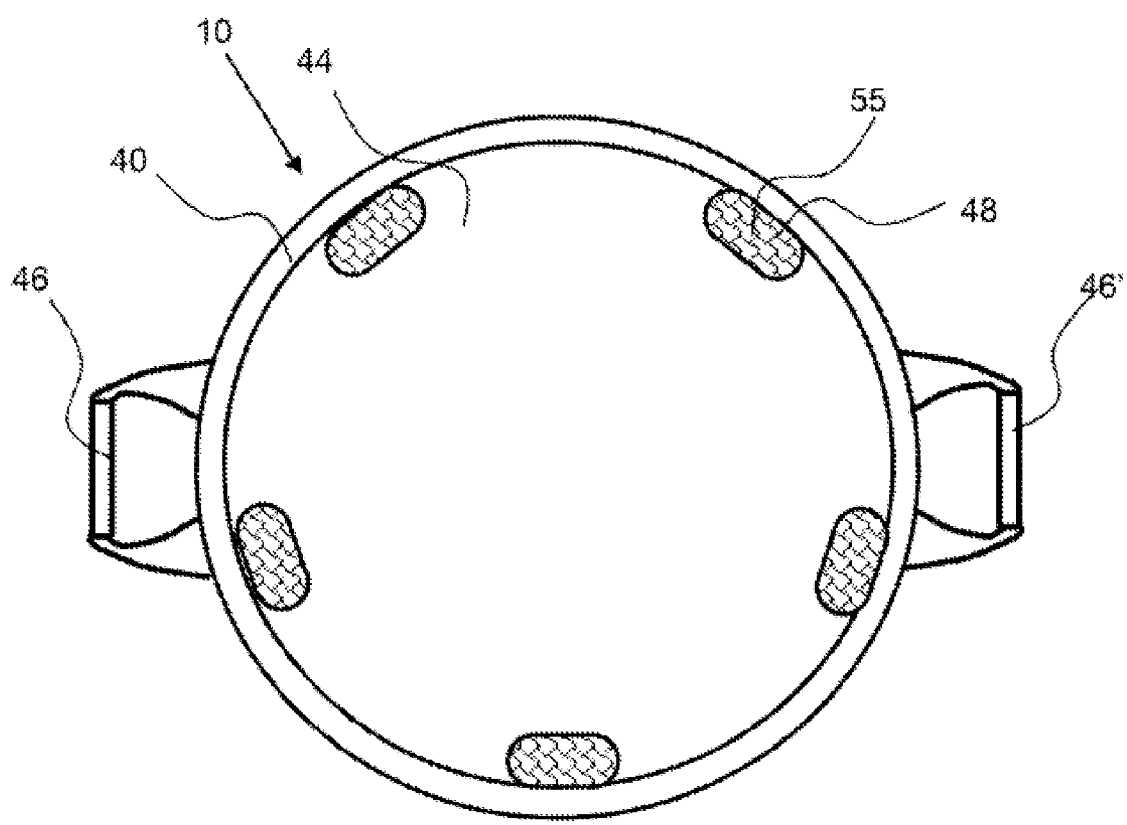
FIG. 6 shows a bottom view of an exemplary tote having a plurality of discrete hook-and-loop fasteners on the bottom surface for detachable attachment to the tote shown in FIG. 5.

Referring now to FIGS. 5 and 6, an exemplary dolly 60 is configured to retain the tote 40 shown in FIG. 6, by hook-and-loop fasteners. The discrete dolly hook-and-loop fasteners 75 are discrete hook-and-loop pads or portions configured substantially uniformly around the dolly, on the top surface 62 of the dolly. The tote has a plurality of discrete hook-and-loop fasteners 55 configured on the bottom 44 of the tote for engagement with the dolly hook-and-loop fasteners. These types of fasteners may be preferred, as it only requires the tote to be placed on the dolly, without alignment of buckles and engagement of buckles between the tote and dolly. Note that a ring of hook-and-loop fastener may be configured on one of the totes or the dolly and the other component may have discrete hook-and-loop fasteners as shown. It may be preferred not to have a complete ring of engagement of hook-and-loop fastener as this may be more difficult to disengage.

Figure 7:
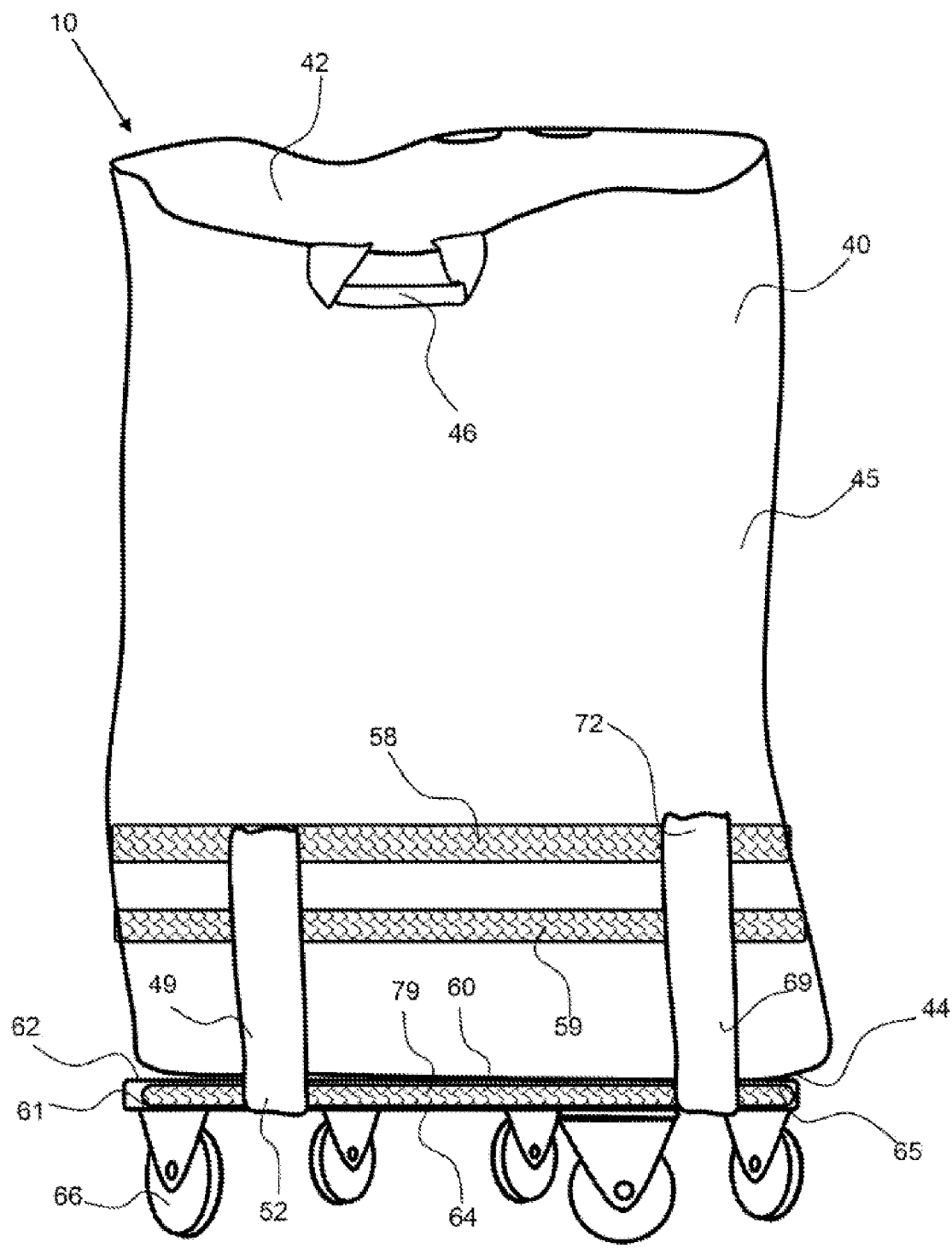
FIG. 7 shows a side view of an exemplary tote-dolly system comprising a tote detachably attached to a dolly and hook-and-loop fastener engagements between the tote and dolly.
Figure 8:
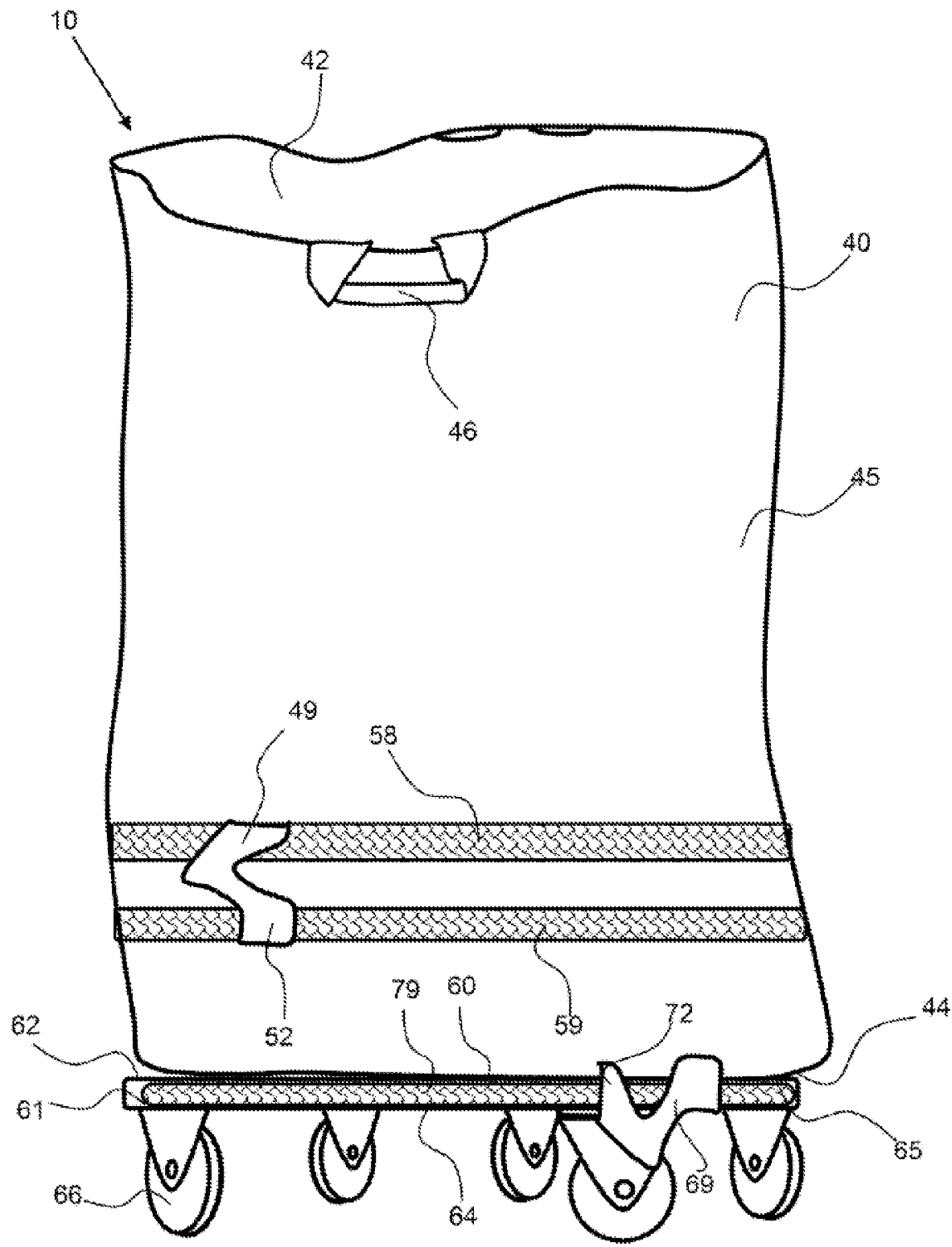
FIG. 8 show the exemplary tote-dolly system shown in FIG. 7 with the tote hook-and-loop fastener and dolly hook-and-loop fastener coupled to extensions and retainer on couplers for detachment of the tote from the dolly.

Referring now to FIGS. 7 and 8, an exemplary tote-dolly system 10 comprises a tote 40 detachably attached to a dolly 60 and hook-and-loop fastener engagements between the tote and dolly. As shown in FIG. 7, a tote hook-and-loop fastener 52 is configured on a fastener extension 49, coupled to the tote, and detachably attaches to a dolly hook-and-loop fastener 72, a dolly ring fastener 78 that extends around a perimeter 65 of the dolly. As shown in FIG. 8, the tote hook-and-loop fastener 52 is detached from the dolly ring fastener 78 and is coupled to a tote fastener coupler 59. The tote fastener coupler retains the tote hook-and-loop fastener 52 in a secured position when not being used to couple the tote to the dolly.

FIG. 7 also shows a dolly with hook-and-loop fastener 72 configured on a fastener extension 69, coupled to the dolly, and detachably attaches to a tote hook-and-loop fastener 52, a tote ring fastener 58 that extends around a perimeter 45 of the tote.

As shown in FIG. 8, the dolly hook-and-loop fastener 72 is detached from the tote ring fastener 58 and is coupled to a dolly fastener coupler 79. The dolly fastener coupler retains the dolly hook-and-loop fastener 72 in a secured position when not being used to couple the dolly to the tote.

Figure 9:
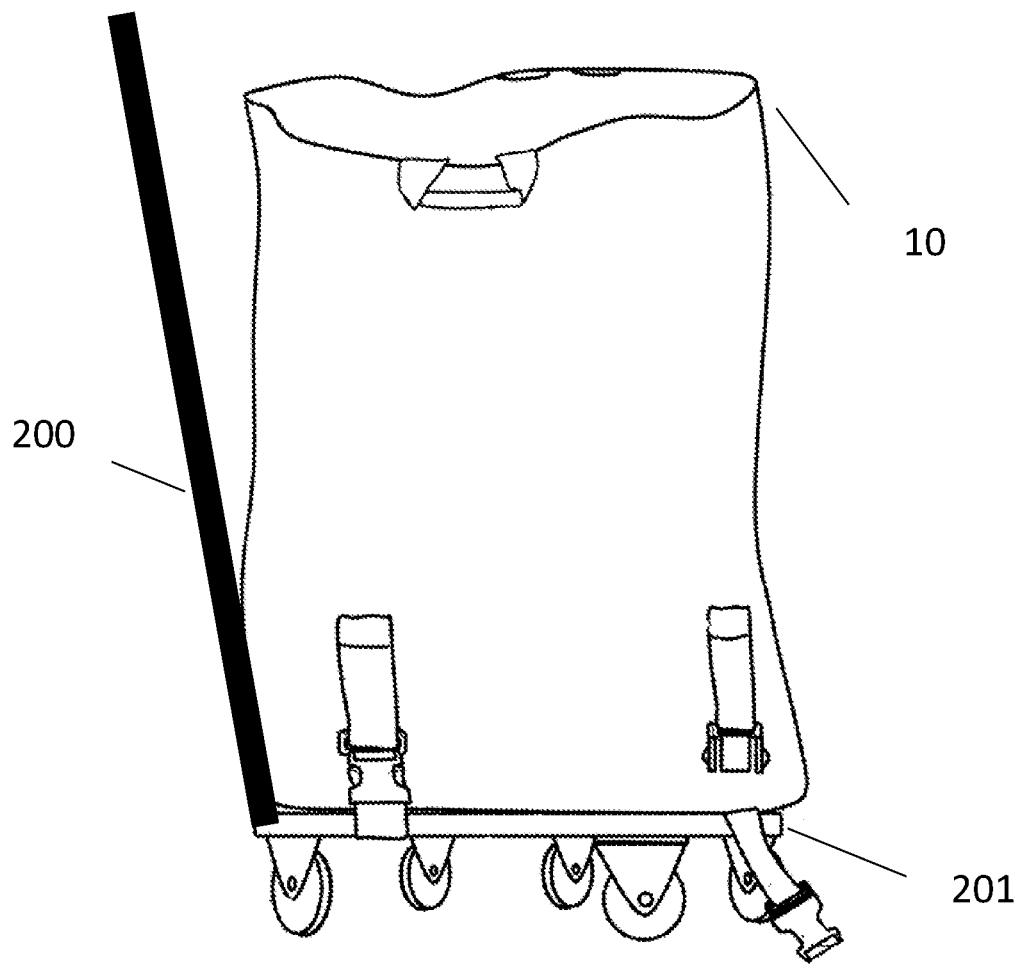
FIG. 9 that shows an alternative tote-dolly system where the dolly has a handle attached to the dolly

Referring to FIG. 9 there is shown an alternative tote-dolly system 10 where the dolly 201 has a handle 200 and the handle 200 is attached to the dolly such that the dolly can easily be moved by a person using the tote-dolly system 10 by gripping the handle 200 with a hand and moving the tote-dolly system 10 by pulling or pushing on the handle 200.

Figure 10:
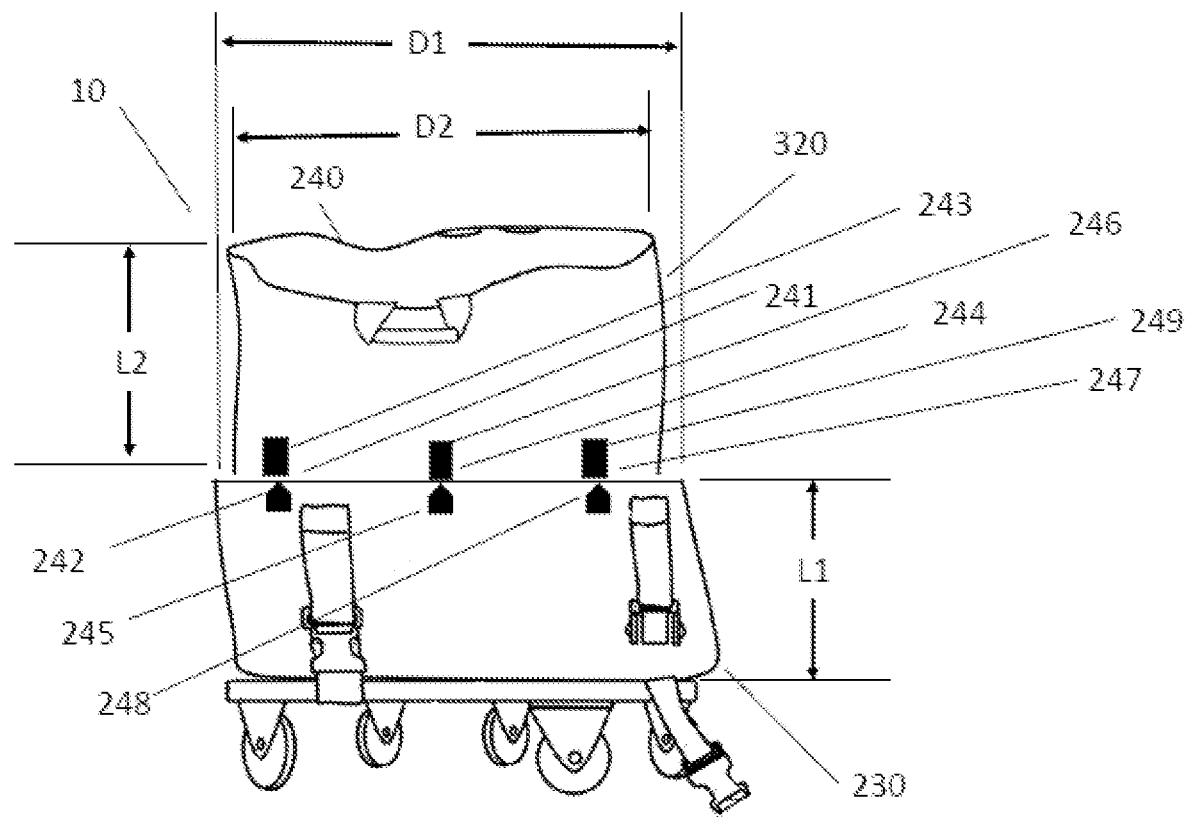
FIG. 10 shows an alternative tote for use with the tote-dolly system

Referring to FIG. 10 shows an alternative tote 320 for use with the tote-dolly system 10. The tote 320 is constructed from a first ring 230 having a length L1 and a diameter D1 and a second ring 240 having a length L2 and a diameter D 2 and diameter D1 is larger than diameter D2 such that diameter D1 can fit within diameter D2. The user of the alternative tote 220 can expand the tote by raising the second ring 240 so that it latches to the first ring 230 using laches 241, 244 and 247. This is similar to a telescoping process where one ring fits inside of the next larger ring. By raising the second ring 240 the volume of the tote is increased by the volume of second ring 240. Latch 241 is comprised of first latch piece 242 on first ring 230 and second latch piece 243 on second ring 240. Latch 244 is comprised of first latch piece 245 on first ring 230 and second latch piece 246 on second ring 240. Latch 247 is comprised of first latch piece 248 on first ring 230 and second latch piece 249 on second ring 240. The alternate tote 320 is envision such that it can have multiple rings and the configuration could have 2 to 10 rings which allow the user of the alternate tote 320 to selectively expand the volume of the alternate tote 320 by raising one of the rings and connecting them with the corresponding latches.

Figure 11:
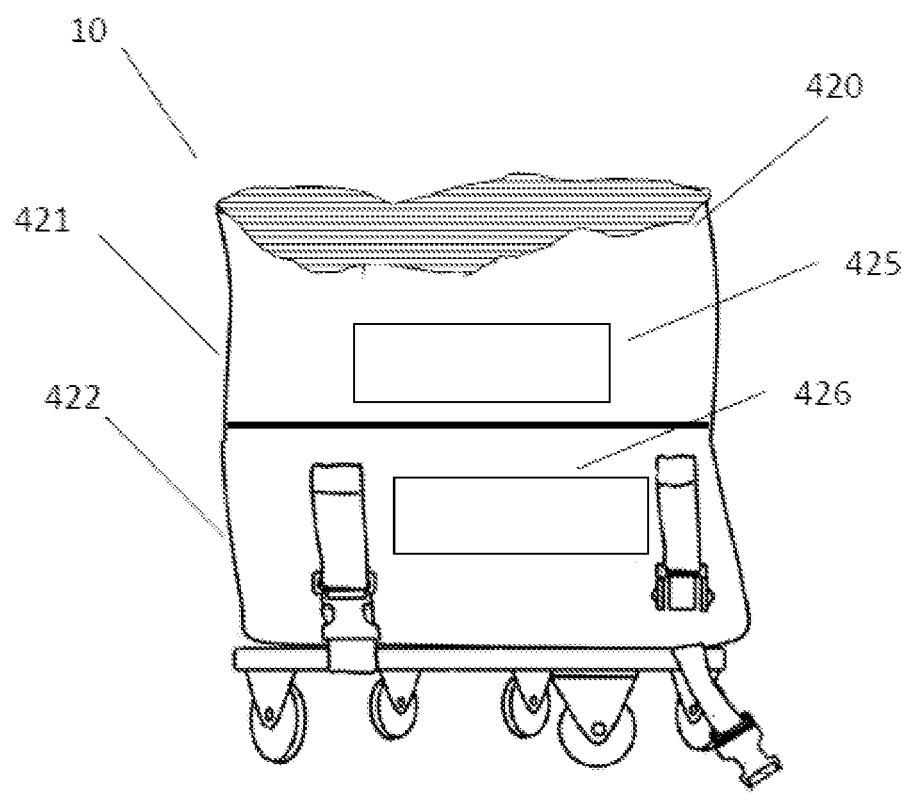
FIG. 11 shows an alternative tote having at least two stackable containers that are arranged in the horizontal orientation.

Referring to FIG. 11 shows an alternative tote 420 having at least two stackable compartments 421 and 422 that are arranged in the horizontal orientation. The compartments allow the user to place items in compartment 421 by using opening an opening or door 425 in on the side of said compartment 421. The user can also place items in compartment 422 by using an opening or door 426 on the side of said compartment 422.

Figure 12:
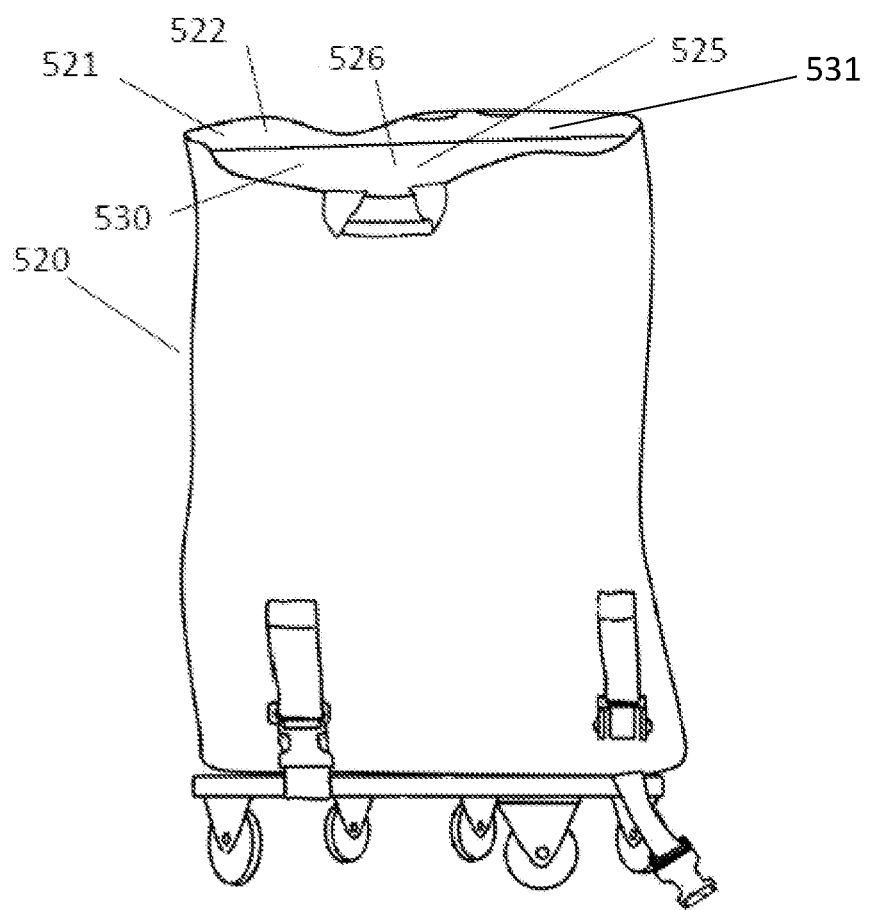
FIG. 12 shows an alternative tote having at least two containers arranged side by side in a vertical arrangement.
Figure 13:
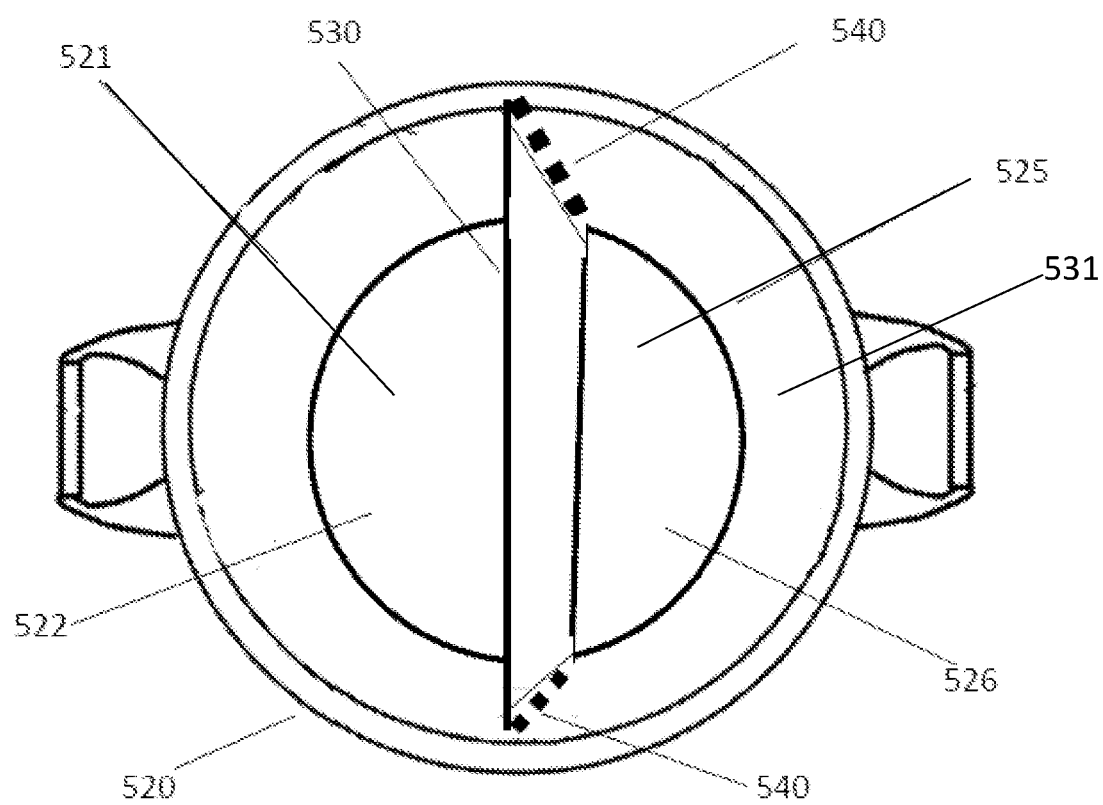
FIG. 13 shows a top view of the alternative tote of FIG. 12.

Referring to FIGS. 12 and 13 shows an alternative tote 520 having at least two compartments 521 and 525 arranged vertically. The compartments are configured such that the user can place items in compartment 521 using opening 522 or they can place items in compartment 525 using opening 526. The alternative tote 520 having at least two compartments 521 and 525 arranged vertically can be formed from a single alternative tote 520 having a divider 530 which is attached to the inside surface 531 of alternative tote 520 such that when the divider is installed it forms at least two compartments 521 and 525. The divider 530 can be fixed or removably attached to the inside surface of alternative tote 520 using at least one fastener 540. The at least one fastener 540 can be selected from the group consisting of a zipper, a clip, a cord and eye, Velcro®, hook-and-loop fastener or an alternative fastener that allows the divider 530 to be removably installed in tote 520.

Since many modifications, variations, and changes in detail can be made to the described embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

In addition, the present invention has been described with reference to embodiments, it should be noted and understood that various modifications and variations can be crafted by those skilled in the art without departing from the scope and spirit of the invention. Accordingly, the foregoing disclosure should be interpreted as illustrative only and is not to be interpreted in a limiting sense. Further it is intended that any other embodiments of the present invention that result from any changes in application or method of use or operation, method of manufacture, shape, size, or materials which are not specified within the detailed written description or illustrations contained herein are considered within the scope of the present invention.

Insofar as the description above and the accompanying drawings disclose any additional subject matter that is not within the scope of the claims below, the inventions are not dedicated to the public and the right to file one or more applications to claim such additional inventions is reserved.

Although very narrow claims are presented herein, it should be recognized that the scope of this invention is much broader than presented by the claim. It is intended that broader claims will be submitted in an application that claims the benefit of priority from this application.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A tote-dolly system comprising:
   a) a tote comprising:
      i) a top opening;
      ii) a bottom;
      iii) at least one tote-fastener;
   b) a dolly comprising:
      i) a dolly frame having a dolly top and a dolly bottom;
      ii) wheels extending from the bottom;
      iii) at least one dolly-fastener;
   c) wherein said tote is removably connected to said dolly when said at least one tote-fastener is connected to said at least one dolly-fastener; and
   d) wherein said tote is comprised of at least two compartments, and wherein said at least two compartments are arranged horizontally and said at least two compartments have an opening on said side of said at least two compartments.

2. The tote-dolly system of claim 1, wherein the tote-fastener is a hook fastener and wherein the dolly-fastener is a loop fastener.

3. The tote-dolly system of claim 1, wherein said tote-fastener is proximal to the bottom of said tote.

4. The tote-dolly system of claim 1, wherein said dolly-fastener is proximal to said top of said dolly.

5. The tote-dolly system of claim 1 wherein said tote-fastener are substantially evenly spaced around the bottom of the tote.

6. The tote-dolly system of claim 1, wherein said dolly-fastener are substantially evenly spaced around said dolly top.

7. The tote-dolly system of claim 1, wherein said dolly-fastener has a length of 200 mm.

8. The tote-dolly system of claim 1, wherein the tote-fastener has a length of 200 mm.

9. The tote-dolly system of claim 4, wherein the dolly-fastener is configured on a perimeter of said dolly frame.

10. A kit of the tote-dolly system of claim 1, wherein the kit is comprised of at least one tote and one dolly.

* * * * *